United States Patent [19]

Burton

[11] 4,045,854
[45] Sept. 6, 1977

[54] DEVICE FOR INSTALLATION OF PLASTIC FIFTH WHEEL LINER ON A TRUCK TRAILER

[75] Inventor: David C. Burton, Williamstown, Ky.

[73] Assignee: Phillips Petroleum Company, Bartlesville, Okla.

[21] Appl. No.: 699,730

[22] Filed: June 24, 1976

[51] Int. Cl.² .......................................... B23P 17/02
[52] U.S. Cl. ...................................... 29/235; 29/238; 29/264
[58] Field of Search ................. 29/225, 226, 227, 228, 29/229, 235, 238, 244, 255, 256, 263, 264; 254/102, 98

[56] References Cited

U.S. PATENT DOCUMENTS

| 1,631,889 | 6/1927 | Rappley | 29/256 |
| 3,030,700 | 4/1962 | Jensen | 29/235 X |
| 3,140,547 | 7/1964 | Blommel | 254/98 X |
| 3,232,584 | 2/1966 | Miles | 254/98 |

Primary Examiner—James L. Jones, Jr.

[57] ABSTRACT

An apparatus is provided for installing a bearing liner on the fifth wheel of a truck trailer with the apparatus including two portions which are in threaded engagement with one another whereby relative rotation of the portions effects extension and retraction of the apparatus. Set screws are provided on one of the threaded portions to removably secure the apparatus to the king pin. The apparatus is secured to the king pin and by extension of the apparatus a retaining ring or keeper is installed on the king pin retaining the bearing liner on the king pin. Handles are provided on one of the threaded portions to aid the operator in rotating the rotatable portion.

2 Claims, 3 Drawing Figures

DEVICE FOR INSTALLATION OF PLASTIC FIFTH WHEEL LINER ON A TRUCK TRAILER

Self-lubricating bearing liners are known in the art and are used to provide a self-lubricating bearing between a trailer and truck using a fifth wheel-type connection. U.S. Pat. Nos. 3,275,390 and 3,427,657 both disclose types of bearing liners which are useable to provide a bearing between the fifth wheel connection of a truck and trailer. In the past, difficulties have been encountered during the installation of the bearing liner on the king pin of the fifth wheel connection. Heretofore two men have generally been required for the installation of the bearing liner on the king pin as, for example, one method was to hold the bearing liner on the trailer king pin while the king pin is inserted in the fifth wheel slot. This practice was costly as well as dangerous. It is more desirable, however, to secure or mount the bearing liner on the king pin using a self-locking retaining keeper to secure the bearing liner in place on the king pin. However, this arrangement also posed problems in that generally two men were required to effect the installation of the bearing liner and retaining keeper. This problem was overcome by use of the structure disclosed in U.S. Pat. No. 3,427,657 wherein a jack arrangement was used to install the bearing liner and retaining keeper on the king pin. However, the jack although effective, was costly and was a large apparatus wherein one end rested on the ground while the other end moved the retaining keeper and bearing liner onto the king pin for installation.

The principal objects and advantages of the present invention are: to provide an apparatus which is simple in construction and small in size which is effective for installing a retaining keeper and bearing liner on a king pin of the trailer portion of a fifth wheel connection between a truck and trailer; to provide such an apparatus which is useable by one person and preferably requiring no additional tools for operation of the installation apparatus; and to provide such an apparatus which is inexpensive and well adapted for its intended use.

Other objects and advantages of the present invention will become apparent from the following detailed description taken in connection with the accompanying drawings wherein are set forth by way of illustration and example certain embodiments of the present invention.

Figure 1:
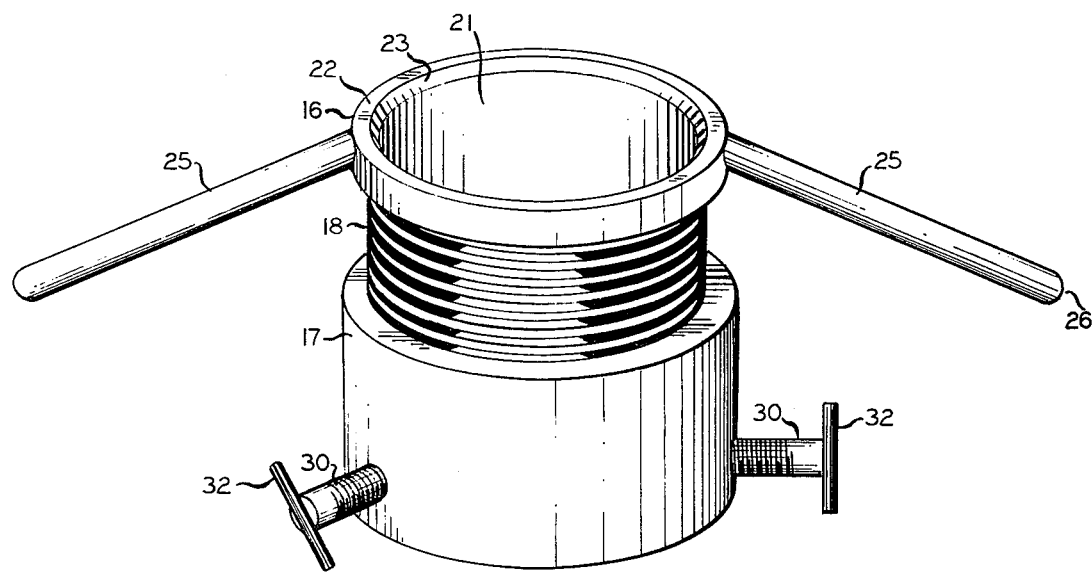
FIG. 1 is a perspective view of the installation apparatus.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriate detailed structure. The reference numeral 1 designates generally an apparatus for installing a bearing liner 2 on a king pin 3 which is on a trailer portion 4 of a fifth wheel connection between a truck and trailer with the king pin 3 extending from a lower surface 6. Fifth wheel connections are well known in the art and therefore need not be further described herein and bearing liners 2 are also known in the art as is described in U.S. Pat. Nos. 3,275,390 and 3,427,657 with the disclosures therein being incorporated herein by reference. The bearing liner 2 is removably retained on the king pin 3, preferably by the use of a self-locking retaining keeper 5. The keeper 5 in the form shown has radial slits 7 which extend from a through opening 8 toward the outer periphery 9 of the keeper 5 thereby forming a plurality of tongues 10. Preferably the bearing liner 2 has an opening 11 for receiving the king pin 3 therethrough with the opening 11 preferably having a recess 12 therearound for receiving the keeper 5 therein to provide a substantially flush installation of the keeper 5 and bearing liner 2. Preferably, the king pin 3 has a circumferential groove 14 adjacent the free end 15 thereof.

Figure 2:
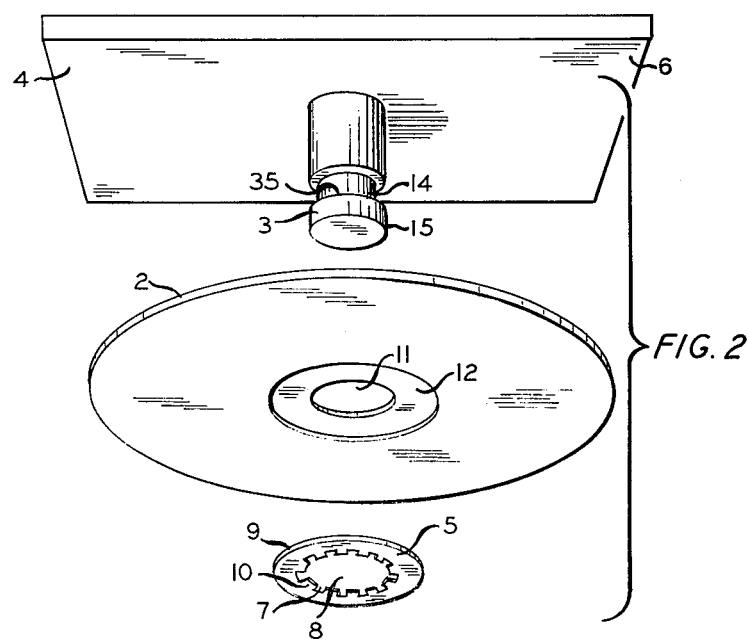
FIG. 2 is an exploded perspective view of the trailer portion of the fifth wheel connection with the bearing liner and self-locking retaining keeper.
Figure 3:
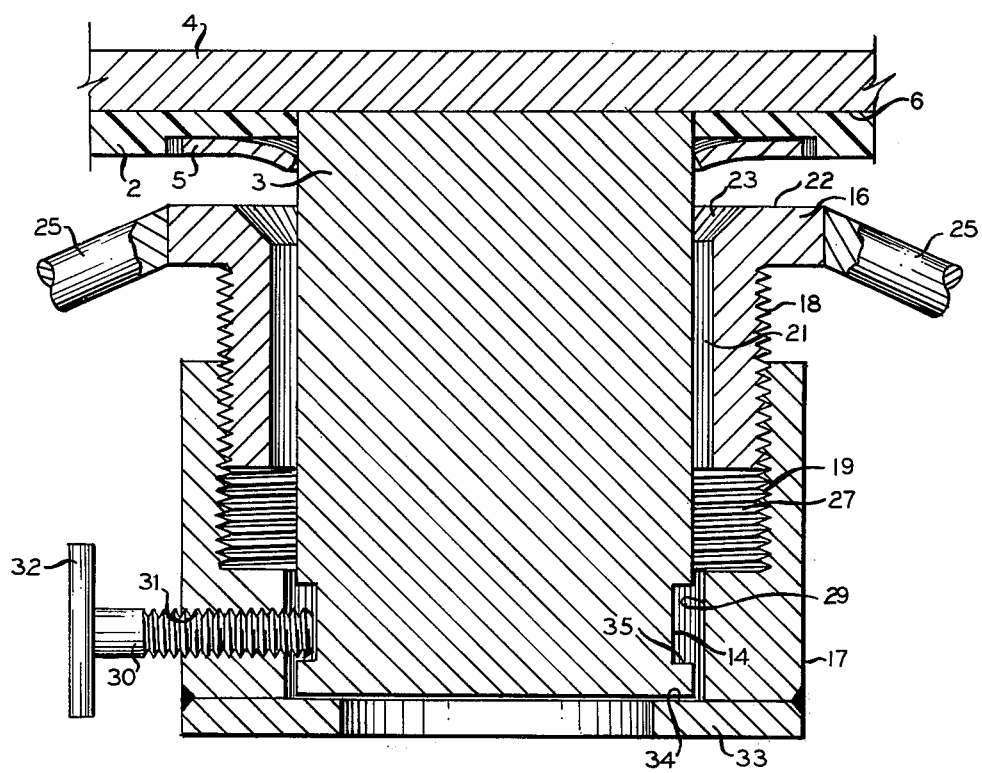
FIG. 3 is a sectional view of the installation apparatus as installed on the king pin for operation.

The apparatus 1 in the illustrated structure includes two mutually threaded members 16 and 17 which by relative rotation effects extension and retraction of the apparatus 1, i.e., lengthening and shortening of the apparatus 1. As shown, the member 16 has a threaded portion 18 which is externally threaded and the member 17 has a threaded portion 19 which is internally threaded. The member 16 has a through bore 21 which is generally coaxial with the threaded portion 18. The member 16 also has a surface 22 on the free end thereof which is adapted for engagement with the retaining keeper 5 and recessed inwardly or has a relief from the surface 22 and extending to the remaining portion of the bore 21. Preferably the recess is a frusto-conical portion 23. The frusto-conical portion 23 allows the tongues 10 to bend downwardly and into the space provided by the conical portion 23 so that same face in a direction toward the end 15, i.e., in the direction that movement of the keeper 5 is not desired, to prevent disengagement of the retaining engagement between the tongues 10 and the king pin 3. It is to be understood that the frusto-conical portion 23 could also be a counterbore or the like which would also provide space for the tongues 10 to move into during installation of the keeper 5 on the king pin 3. At least one handle and, as shown, two handles 25 are secured to the member 16 and extend laterally outwardly therefrom with each of the handles 25 having a free end 26 which is spaced from the bearing liner 2 during installation so as to provide room for gripping of the handles 25 by the hand of the operator. As shown, the handles 25 are inclined downwardly from the surface 22 as seen in FIG. 2.

The member 17 has a bore 27 at least partially therethrough and, as shown, extends through the member 17 with the bore 27 being generally coaxial with the threaded portion 19 and thereby generally coaxial with the bore 21 and threaded portion 18. Preferably a thickened wall section 29 is provided adjacent a lower disposed end of the member 17 and a plurality of shoulder-forming members are movably mounted on the member 17 as, for example, by extending through the wall section 29 with the bore 27 also continuing on through the wall section 29. Preferably, the shoulder-forming members 30 are set screws and are in threaded engagement with the member 17 as, for example, by being threadably received in threaded bores 31. Preferably, each of the set screws 30 has a handle 32 secured thereto to help effect operation of the set screws 30. In the illustrated structure the member 17 has a shoulder-forming member 33 on one end thereof which forms a shoulder 34 useable for a purpose later to be described. Preferably the set screws 30 are in a plurality and are spaced around the member 17 as, for example, three in number spaced approximately 120° apart.

The present invention is more fully understood by a description of the operation thereof. When it is desired to install a bearing liner 2 on a king pin 3, the bearing liner 2 is installed on the king pin 3 by having same extend through the opening 11. With the apparatus 1 in its retracted or shortened position, a retaining keeper 5 is placed on the surface 22 of the member 16 with the opening 8 generally in alignment with the bore 21. The apparatus 1 is then installed on the king pin 3 so that the king pin 3 extends through the keeper 5 and the bores 21 and 27 with the shoulder 34 providing a stop to limit the movement of the apparatus 1 onto the king pin 3. The retaining keeper 5 has the opening 8 thereof slightly larger than the diameter of the lower portion 15 of the king pin 3, i.e., the portion below the groove 14, whereby the keeper can slip onto the king pin 3. With the apparatus 1 on the king pin 3, the set screws 32 are tightened whereby a shoulder formed by the set screws 32 engages a surface 35 which partially defines the groove 14 and forms a shoulder for engagement with the set screws 32 to prevent axial movement of the apparatus 1 on the king pin 3. Tightening of the set screws 32 against the king pin 3 will prevent rotational movement of the member 17 on the king pin 3. After the apparatus 1 is installed on the king pin 3, the operator grasps the handles 25 and rotates the member 16 relative to the member 17 thereby extending the apparatus 1 and urging the retaining keeper 5 onto the upper portion of the king pin 3 and moves the bearing liner 2 into engagement with the lower surface 6 of the fifth wheel connecting portion 4. After the keeper 5 and bearing liner 2 are installed, the operator then moves the handles 20, thereby rotating the member 16 in an opposite direction to retract or shorten the apparatus 1. The set screws 30 can then be loosened and the apparatus 1 removed from the king pin 3.

It is to be understood that while I have illustrated and described certain forms of my invention, it is to be understood that same is not to be limited to the specific form or arrangement of parts herein described and shown.

What is claimed and desired to be secured by Letters Patent is:

1. An apparatus for installing a fifth wheel bearing liner and retaining keeper on a king pin of a trailer, said apparatus comprising:
   a. a first member having a first threaded portion, said first member having a bore at least partially therethrough with the longitudinal axes of the bore being generally coaxial with the longitudinal axis of the first threaded portion;
   b. at least one shoulder forming member movably mounted on said first member and is selectively movable into and out of engagement with a portion of a king pin for removably securing the first member against longitudinal and rotational movement on the king pin, said shoulder forming member being selectively engageable with at least one surface partially defining a groove in said king pin;
   c. a second member having a second threaded portion in threaded engagement with the first threaded portion whereby relative rotation between said first and second members effects extension and retraction of the assembly thereof, said second member having a through bore generally coaxial with the second threaded portion, said second member has a surface on a free end thereof adapted for engagement with a keeper to be installed on the king pin and has a recess surrounding said second member bore and recessed in said second member surface for providing clearance for a portion of said keeper during installation thereof; and
   d. a handle secured to and extending outwardly from said second member and having a free end portion, said free end portion of the handle is spaced below said second member surface providing clearance between the handle free end member surface providing clearance between the free end portion of the handle and a bearing and a bearing liner, which is to be supported on said second member surface for installation with said keeper, during installation of the liner and keeper.

2. The apparatus set forth in claim 1 wherein:
   a. said shoulder-forming member being a set screw and being in a plurality, each said set screw being in threaded engagement with said first member and having a handle thereon.

* * * * *